Oct. 7, 1947.   M. J. MEEK   2,428,497
FISHING WEIGHT
Filed Sept. 14, 1945

MELVIN J. MEEK.
INVENTOR.

BY Oltsch & Knoblock
ATTORNEYS.

Patented Oct. 7, 1947

2,428,497

UNITED STATES PATENT OFFICE 2,428,497

FISHING WEIGHT

Melvin J. Meek, South Bend, Ind.

Application September 14, 1945, Serial No. 616,187

1 Claim. (Cl. 43—52)

This invention relates to improvements in fishing weights.

It is common practice in fishing to attach to a leader or the free end of a fishing line a small weight which serves to carry the same and the hook or lure below the surface of the water. As different lures are used and different fishing conditions are encountered, it is frequently desirable to vary the amount of weight which is used. Small weights are commonly used so that the weight effective on the fishing equipment can be varied by adding or removing individual weights.

The weights now commonly used are small spherical or cylindrical bodies of lead which have tapered radial slots therein. The line or leader is inserted in the slot and the opposite lips of the weight are then pinched together to grip the line firmly and prevent movement of the weight along the line. The pinching operation usually requires the use of a tool, such as pliers, to secure a tight grip on the line because the thickness and shape of the lips resists bending by the fingers. A different tool is required to pry the lips apart in order to remove the weight from the line. A knife is generally used for this purpose because the blade can be forced between lips of the weight. However, the weights are small so that the use of a knife may result in cutting of the angler's fingers, and is difficult because the small size of the weight and its shape do not provide a fulcrum for the manipulation of the blade to spread the weight lips apart. Furthermore, the use of a knife frequently results in cutting of the line or leader so that the fishing equipment must be completely reassembled.

It is the primary object of this invention to provide a weight which overcomes all of the disadvantages mentioned above.

A further object is to provide a fishing weight which can be applied to and removed from a line without the use of tools.

A further object is to provide a lead slug or weight with a comparatively thin ear projecting therefrom and readily bendable by hand to desired shape and position.

Other objects will be apparent from the description and appended claim.

Figure 1:
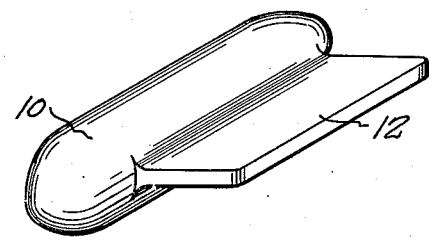
Fig. 1 is a perspective view of the weight.

Referring to the drawing, which illustrates one embodiment of the invention, the numeral 10 designates a small slug or body preferably formed of lead or other readily deformable material. The body is preferably elongated and of generally circular cross-section. The weight may be of any size desired and for purposes of illustration only a weight convenient for fly casting might be in the order of $\frac{1}{8}$ inch in diameter and $\frac{1}{4}$ inch or more in length.

Figure 2:
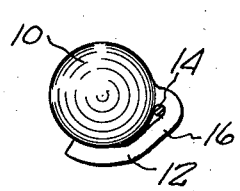
Fig. 2 is an end view of a weight secured to a line.
Figure 3:
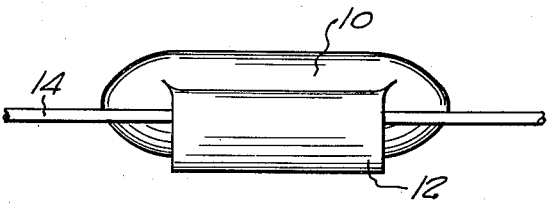
Fig. 3 is a side view of a weight secured to a line.

A comparatively thin flat ear 12 projects longitudinally and radially from the body 10 and is formed integrally therewith. The ear 12 will preferably extend for the major portion of the length of the body and will be of a width great enough to permit bending thereof around a leader or line 14 and against the body 10 as shown in Figs. 2 and 3. The ear 12 is thin compared to the thickness or diameter of the body, so that it may be bent easily by hand. It must be thick enough to maintain its shape, to effectively grip the leader or line when bent thereover, and to prevent rupture or breakage along the line of bend.

The use of the weight is apparent from Figs. 2 and 3. The weight 10 is positioned alongside and in contact with leader or line 14, and preferably engages the same at the juncture of the ear 12 and the body. The ear is then bent over the leader or line and around and in engagement with the body. In bending the ear it is preferably pressed firmly against the leader or line to grip the same effectively, and will preferably follow the cross-sectional contour of the leader or line for the major portion of its circumference by being pressed inwardly at 16. To release the weight the ear can be swung or bent away from the body by gripping the body at its ends with one hand and using a finger nail to pry under the free end of the ear until the ear is bent enough to enable it to be gripped by the fingers of the other hand. Thus the operations of applying and removing the weight are easily performed by hand without tools. After repeated flexing or bending of the ear it will break at the line of bend. However, in actual use I have found that this construction of weight has a useful life at least as long as a conventional slotted weight and can be applied and removed from a line as many times as the conventional type of weight.

I claim:

A weight adapted for attachment to a fishing leader, comprising an elongated body of substantially circular cross-sectional shape and a tab projecting laterally from said body lengthwise thereof, said body and tab being formed integrally from lead and said tab being of comparatively thin section for easy bending thereof against said body in leader-clamping position, said tab extending for the major portion of the length of said body and forming an elongated leader-abutting surface.

MELVIN J. MEEK.

REFERENCES CITED

The following references are of record in the file of this patent:

UNITED STATES PATENTS

| Number | Name | Date |
|--------|------|------|
| 399,866 | Gage | Mar. 19, 1889 |